United States Patent
Schmitz et al.

(10) Patent No.: US 11,411,265 B2
(45) Date of Patent: Aug. 9, 2022

(54) COVER FOR ELECTRICALLY COUPLING MULTIPLE STORAGE CELLS OF AN ELECTRICAL ENERGY STORAGE MODULE

(71) Applicant: Bayerische Motoren Werke Aktiengesellschaft, Munich (DE)

(72) Inventors: Andre Schmitz, Munich (DE); Boris Zuev, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 130 days.

(21) Appl. No.: 16/663,907

(22) Filed: Oct. 25, 2019

(65) Prior Publication Data

US 2020/0058970 A1   Feb. 20, 2020

Related U.S. Application Data

(63) Continuation of application No. PCT/EP2018/059812, filed on Apr. 18, 2018.

(30) Foreign Application Priority Data

Apr. 26, 2017   (DE) .................... 10 2017 206 978.3

(51) Int. Cl.
  *H01M 10/6552*   (2014.01)
  *H01M 10/6569*   (2014.01)
  (Continued)

(52) U.S. Cl.
  CPC ... *H01M 10/6552* (2015.04); *H01M 10/0525* (2013.01); *H01M 10/6569* (2015.04); *H01M 50/20* (2021.01); *H01M 50/529* (2021.01)

(58) Field of Classification Search
  CPC ......... H01M 10/6552; H01M 10/6559; H01M 50/529
  See application file for complete search history.

(56) References Cited

U.S. PATENT DOCUMENTS

| 5,017,441 A | 5/1991 | Lindner |
| 6,346,011 B1 | 2/2002 | Ikeda |
| (Continued) | | |

FOREIGN PATENT DOCUMENTS

| CN | 102683621 A | 9/2012 |
| CN | 103094499 A | 5/2013 |
| (Continued) | | |

OTHER PUBLICATIONS

International Search Report (PCT/ISA/210) issued in PCT Application No. PCT/EP2018/059812 dated Aug. 17, 2018 with English translation (seven (7) pages).

(Continued)

*Primary Examiner* — Ula C Ruddock
*Assistant Examiner* — Thomas H. Parsons
(74) *Attorney, Agent, or Firm* — Crowell & Moring LLP

(57) ABSTRACT

A cover electrically couples multiple storage cells of an electrical energy storage module. The cover has electrically conductive contact sockets which are embedded in an electrically insulating material of the cover and taper inwards on their insides, and into which terminals of the storage cells can be inserted to make electrical contact. Two connections are provided, one of which forms a positive terminal and the other of which forms a negative terminal of the electrically coupled storage cells. Multiple conductors electrically couple the storage cells, in particular for coupling the storage cells in series, in a predefined manner. The conductors are completely accommodated inside the cover, and the cover can be mounted on the storage cells such that it can be detached non-destructively.

12 Claims, 2 Drawing Sheets

(51) Int. Cl.
*H01M 10/0525* (2010.01)
*H01M 50/20* (2021.01)
*H01M 50/529* (2021.01)

(56) References Cited

U.S. PATENT DOCUMENTS

| | | | |
|---|---|---|---|
| 7,479,040 B2 * | 1/2009 | Cho | H01M 50/502 439/627 |
| 2006/0255764 A1 | 11/2006 | Cho | |
| 2012/0231324 A1 | 9/2012 | Brisbane | |
| 2013/0112551 A1 | 5/2013 | Fritz | |
| 2014/0038008 A1 | 2/2014 | Saitou et al. | |
| 2014/0342212 A1 | 11/2014 | Goesmann et al. | |
| 2016/0043377 A1 | 2/2016 | Heid | |
| 2016/0174414 A1 | 6/2016 | Molitor et al. | |
| 2017/0077487 A1 | 3/2017 | Coakley et al. | |

FOREIGN PATENT DOCUMENTS

| | | |
|---|---|---|
| CN | 105190946 A | 12/2015 |
| CN | 105706540 A | 6/2016 |
| DE | 10 2008 010 837 A1 | 8/2009 |
| DE | 20 2009 015 277 U1 | 5/2010 |
| DE | 10 2008 059 947 A1 | 6/2010 |
| DE | 10 2009 035 470 A1 | 2/2011 |
| DE | 10 2009 053 344 A1 | 5/2011 |
| DE | 10 2011 003 964 A1 | 8/2012 |
| DE | 102011003964 * | 8/2012 |
| DE | 10 2011 085 930 A1 | 5/2013 |
| DE | 10 2011 087 040 A1 | 5/2013 |
| DE | 10 2013 220 044 A1 | 4/2015 |
| WO | WO 2009/103522 A1 | 8/2009 |
| WO | WO 2012/107446 A1 | 8/2012 |
| WO | WO2018021084 * | 2/2018 |
| WO | WO2018021084 A * | 2/2018 |

OTHER PUBLICATIONS

German-language Written Opinion (PCT/ISA/237) issued in PCT Application No. PCT/EP2018/059812 dated Aug. 17, 2018 (six (6) pages).

German-language Search Report issued in counterpart German Application No. 10 2017 206 978.3 dated Jan. 24, 2018 with partial English translation (15 pages).

Chinese-language Office Action issued in Chinese Application No. 201880027375.3 dated Sep. 30, 2021 with English translation (17 pages).

Chinese-language Office Action issued in Chinese Application No. 201880027375.3 dated Apr. 1, 2022 with English translation (15 pages).

"Lead-acid started batteries Dimension and marking of terminals", Collection of National Standards for Automobiles, Electrics Volumes, Oct. 31, 1999 (five (5) pages).

* cited by examiner

COVER FOR ELECTRICALLY COUPLING MULTIPLE STORAGE CELLS OF AN ELECTRICAL ENERGY STORAGE MODULE

CROSS REFERENCE TO RELATED APPLICATIONS

This application is a continuation of PCT International Application No. PCT/EP2018/059812, filed Apr. 18, 2018, which claims priority under 35 U.S.C. § 119 from German Patent Application No. 10 2017 206 978.3, filed Apr. 26, 2017, the entire disclosures of which are herein expressly incorporated by reference.

BACKGROUND AND SUMMARY OF THE INVENTION

The invention relates to a cover for electrically coupling a plurality of storage cells of an electrical energy storage module, to an electrical energy storage module having such a cover, and to a motor vehicle having such an energy storage module.

There are currently many possible ways of electrically coupling the individual storage cells of an electrical energy storage module to one another in the prior art. The poles of the storage cells are usually connected to cell connectors in such a manner that the storage cells are connected in series. In this case, the cell connectors are welded to the poles of the storage cells, in which case these connections cannot be released in a non-destructive manner. However, in the event of damage to a storage cell, the entire energy storage module must be replaced, which is associated with high costs.

A further possible way of coupling storage cells by means of an attachable carrier plate is known, for example, from DE 10 2011 087 040 A1.

An object of the present invention is to provide a cover for electrically coupling a plurality of storage cells of an electrical energy storage module, which cover provides easier handling.

One exemplary embodiment of the invention provides a cover for electrically coupling a plurality of storage cells of an electrical energy storage module. The cover includes electrically conductive contact sockets which are embedded in an electrically insulating material of the cover, taper inward (that is to say in the direction away from the storage cells) on their inner sides and into which poles of the storage cells can be inserted so as to make electrical contact. Two connections, one of which forms a positive pole and the other of which forms a negative pole of the electrically coupled storage cells, are provided, as well as a plurality of conductor tracks for electrically coupling the storage cells, in particular for coupling the storage cells in series, in a predefined manner. The conductor tracks are completely accommodated inside the cover, wherein the cover can be mounted on the storage cells such that it can be released in a non-destructive manner.

The contact sockets are preferably accommodated in the cover in such a manner that, of the outer sides of the contact sockets, at most the sides facing the storage cells are exposed. In this case, the contact sockets would not project beyond the outer side of the cover. However, it is also possible for the contact sockets to project somewhat beyond the outer side of the cover, in particular to project beyond the outer side by at most 30% of the contact socket depth. In this case, the contact socket depth is the depth inside the contact socket along the insertion direction of the poles of the storage cells.

The conductor tracks are completely accommodated inside the cover, which means that the conductor tracks are not externally exposed to the environment surrounding the cover. The advantage of this exemplary embodiment is that this creates a single-piece compact cover which is already fastened by pushing or plugging it onto the poles of the storage cells since, as a result of the tapering contact sockets, the cover is fastened to the energy storage module to a certain degree as it is plugged onto the poles. As a result of the cover which can be removed in a non-destructive manner, in the event of a defect in an individual storage cell, the cover can be removed in order to replace an individual storage cell and can be plugged on again after the defective storage cell has been replaced.

According to another exemplary embodiment of the invention, the contact sockets are conical on their inner sides. The contact sockets are therefore used, on the one hand, for guidance during plugging on and therefore for orienting the cover with respect to the energy storage module and, on the other hand, for fastening the cover to the energy storage module by virtue of the poles being pushed into the conical contact sockets and therefore being held therein in a frictionally engaged manner.

According to another exemplary embodiment of the invention, the cover has an at least three-layer structure, wherein a conductor track layer is embedded between two electrically insulating cover layers. The two cover layers therefore form touch protection and the conductor track layer in between can be adapted, depending on the desired storage cell connection or coupling, such that different covers with different connections, for example covers for a serial electrical connection of the storage cells and covers for a parallel electrical connection of the storage cells, can be provided with relatively little effort.

According to another exemplary embodiment of the invention, the cover has a cavity for liquid coolant or refrigerant. The advantage of this exemplary embodiment is that the waste heat of the energy storage module is dissipated at the top in the region of the poles and conductor tracks. In the prior art, the energy storage modules are often cooled at the bottom, that is to say on the opposite side of the storage cells, but there is a greater need for cooling on the side of the poles.

According to another exemplary embodiment of the invention, the cavity is adjacent to the conductor tracks, but is outside the conductor tracks.

According to another exemplary embodiment of the invention, the cover respectively has an inlet and an outlet which open into the cavity and via which coolant or refrigerant can be supplied and discharged.

According to another exemplary embodiment of the invention, the coolant is a phase change material, in particular a two-phase phase change material.

According to another exemplary embodiment of the invention, the cavity for the coolant or refrigerant is provided by a pipe which, in order to form the conductor tracks, is coated with electrically conductive material in sections or is composed of sections of electrically conductive material and electrically insulating material.

The invention also provides an electrical energy storage module having a multiplicity of storage cells which are electrically coupled using a cover according to one of the preceding exemplary embodiments.

According to one exemplary embodiment of the energy storage module, the storage cells are lithium ion batteries.

The invention also provides a motor vehicle having such an electrical energy storage module.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
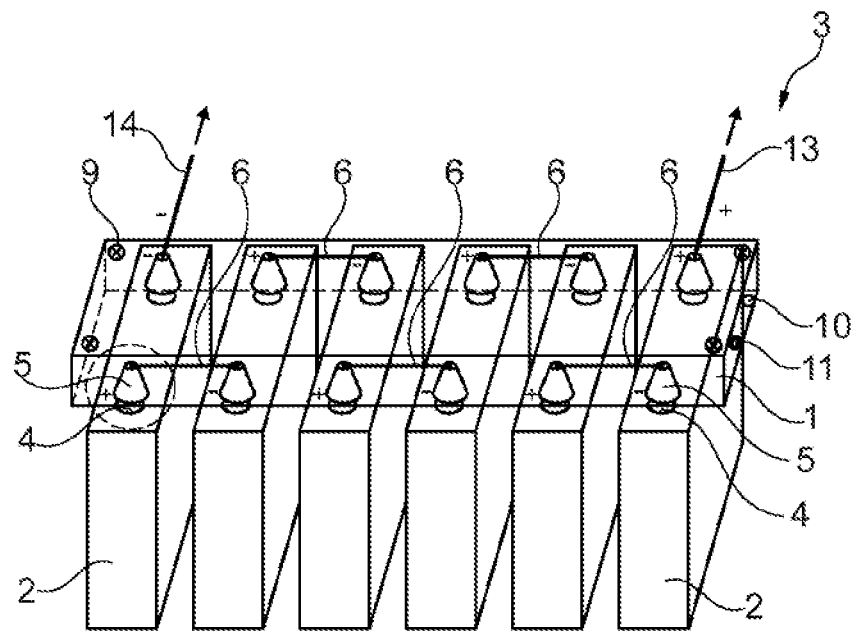
FIG. 1 is a schematic three-dimensional illustration of a cover according to an embodiment of the invention and of a multiplicity of storage cells.
Figure 2:
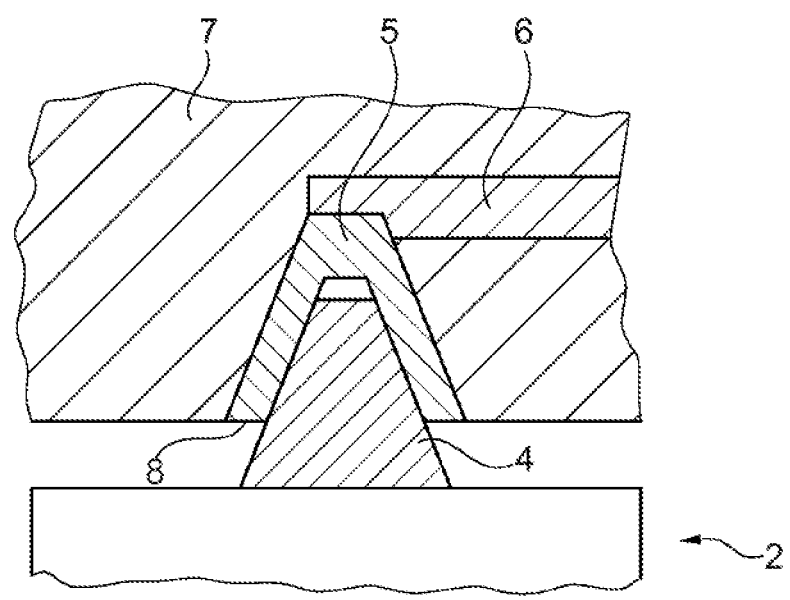
FIG. 2 is a schematic detailed view of a contact socket and of a section of a conductor track in the cover from FIG. 1.

FIG. 1 is a schematic three-dimensional illustration of a cover 1 and of a multiplicity of storage cells 2 (only some are provided with a reference sign). FIG. 2 is a schematic detailed view of a contact socket and of a section of a conductor track in the cover from FIG. 1. The storage cells 2 are preferably prismatic, rechargeable lithium ion batteries. The multiplicity of storage cells 2 are preferably electrically connected in series with one another, but parallel coupling would also be conceivable depending on the application. This multiplicity of storage cells 2 which are electrically coupled to one another and are assigned to a single cover 1 form, together with the cover 1, an electrical energy storage module 3. In motor vehicles, a plurality of such energy storage modules 3 are usually electrically connected in parallel with one another and form an electrical energy store which provides the energy at least for driving the motor vehicle. The storage cells 2 each have two poles 4, more precisely an anode terminal and a cathode terminal, which are arranged on the same side of the storage cell 2. The poles 4 (only some are provided with a reference sign) project from the storage cell 2 and taper their outer circumference in the direction away from the storage cell 2. In particular, the poles 4 taper a diameter of their circular cross section in the direction away from the storage cell 2. The poles 4 are preferably conical, cone-shaped or frustoconical.

The cover 1 is preferably prismatic and has contact sockets 5 (only some are provided with reference signs) which are embedded in the cover 1 and into which the poles 4 of the storage cells can be inserted. The inner side of a contact socket 5 is respectively adapted to the outer side of the pole 4 assigned to this contact socket, that is to say they have a substantially corresponding form, with the result that the inner sides of the contact sockets 5 rest against the outer sides of the poles 4 as well as possible in order to establish good electrical contact. The contact sockets 5 of an energy storage module 3 are connected to one another by way of conductor tracks 6 in such a manner that the desired coupling of the storage cells 2, for example an electrical series or parallel circuit, is implemented. For example, as illustrated in FIG. 1, an anode terminal of a storage cell 2 can be respectively connected to a cathode terminal of an adjacent storage cell 2 by virtue of the contact sockets 5 in contact with these terminals being electrically connected by way of a conductor track 6. The conductor tracks 6, in particular the ends of the conductor tracks 6, are connected to the contact sockets 5 in an electrically conductive manner, in particular releasably in a non-destructive manner. For example, the conductor tracks 6 can be welded or soldered to the contact sockets 5.

However, it is also possible for the contact sockets 5, for example two contact sockets, to each be formed in one piece with a conductor track 6. The conductor tracks 6 and the contact sockets 4 are embedded in an electrically insulating material 7 of the cover 1. In this case, the conductor tracks 6 are preferably not exposed to the outside (that is to say to the environment surrounding the cover 1) at any point. The contact sockets 5 are at least predominantly embedded in the cover 1, and the contact sockets 5 are preferably accommodated in the cover 1 in such a manner that, of the outer sides of the contact sockets, at most the sides 8 facing the storage cells 2 are exposed. In this case, the contact sockets would not project beyond the outer side of the cover. However, it is also possible for the contact sockets to project beyond the outer side of the cover, in particular to project beyond the outer side by at most 30% of the contact socket depth. In this case, the contact socket depth is the depth inside the contact socket 5 along the insertion direction of the poles 4 of the storage cells 2.

The contact sockets 5 are tapered on their inner side in the direction away from the storage cell 2 along an insertion direction of the poles 4. In particular, the contact sockets 5 on their inner side taper a diameter of their circular cross section (perpendicular to the insertion direction) in the direction away from the storage cell 2. The contact sockets 5 are preferably conical, cone-shaped or frustoconical. The cover 1 can, but need not necessarily, be releasably connected to the remaining energy storage module (not illustrated) or to a frame (not illustrated) holding the energy storage modules by means of screw connections 9. The cover 1 may be produced from rigid materials. The cover 1 may likewise be produced from flexible materials, with the result that it is flexible. The latter would facilitate plugging of the contact sockets 5 onto the poles 4 and therefore the application of the cover 1 to the storage cells 2 and would ensure a better frictionally engaged hold.

Various implementations are possible. The electrically insulating material 7 may be molded as a molding compound around the contact sockets 5 and conductor tracks 6. In addition, the electrically insulating material 7 may be in the form of two plates, one plate facing the storage cells 2 and one plate facing away from the storage cells 2, between which the conductor tracks 6 are formed in the form of a third layer. The plates may be rigid or flexible plates. In this case, the conductor track layer could be countersunk in one of the two plates or in both plates made of electrically insulating material. The conductor tracks 6 may be in the form of a multiplicity of individual rod-shaped flat conductor tracks, in particular made of metal, which are separate from one another. It is likewise contemplated for the conductor tracks to be in the form of metal conductor tracks of a circuit board or printed circuit board. The conductor tracks 6 can also be implemented in the form of a plug-type system, with the result that the connection of the contact sockets 5 can be changed. In this case, plug-type possibilities could be provided in one of the two plates or in both plates made of electrically insulating material, into which the conductor tracks 6 can be inserted during production of the cover 1 depending on the desired connection, with the result that covers with a different connection of the contact sockets 5 can be provided with relatively little effort. The cover 1 has a total of two connections 13 and 14, one of which forms a positive pole and the other of which forms a negative pole of the electrically coupled storage cells 2. That is to say, in the case of storage cells 2 connected in series with one another by means of the cover 1, the connection 13 would be the positive pole of this series circuit and the connection 14 would be the negative pole of this series circuit.

Figure 3:
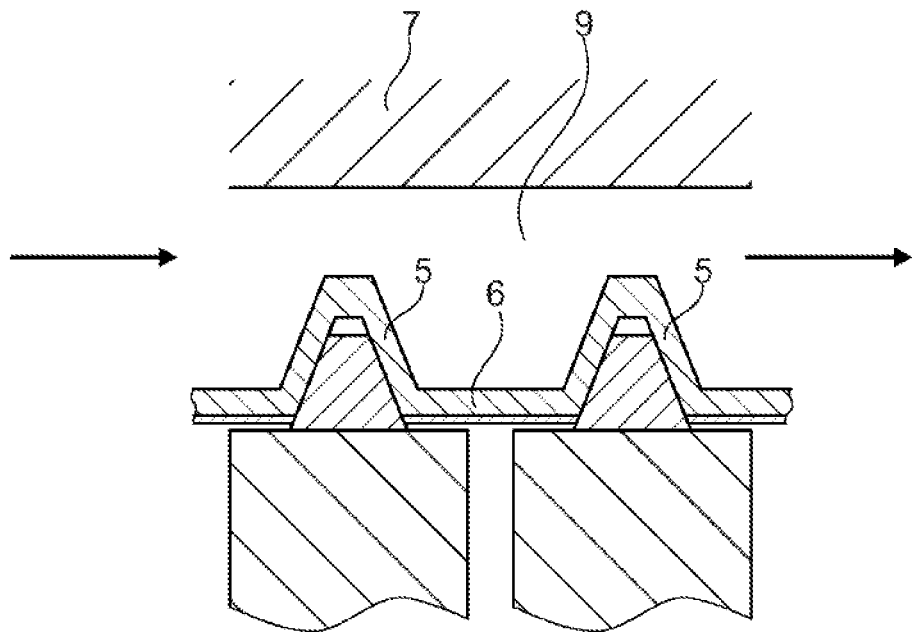
FIG. 3 is a schematic illustration of one development of the cover from FIG. 1, having a coolant or refrigerant flow adjacent to the conductor tracks.

FIG. 3 is a schematic illustration of one development of the cover 1 from FIG. 1, having a coolant or refrigerant flow adjacent to the conductor tracks. According to this development, the cover 1 can be provided with integrated cooling. As illustrated in FIG. 3, a cavity 9 is provided adjacent to the conductor tracks 6 which are provided between the contact sockets 5. In the exemplary embodiment in FIG. 3, the contact sockets 5 and the conductor tracks 6 connecting the latter are formed in one piece, in particular monolithically. The cavity 9 is adapted to accommodate a cooling medium, wherein the cooling medium can directly touch the contact sockets 5 and the conductor tracks 6, or an electrically insulating coating is formed in between, for example Teflon or a polymer coating. If the cooling medium directly touches the contact sockets 5 and the conductor tracks 6, the cooling medium must be an electrically non-conductive cooling medium, for example an electrically non-conductive oil. The cooling medium is preferably a liquid coolant or refrigerant.

The cavity 9 may also be a space which is closed in a liquid-tight manner and is filled with a phase change material as the cooling medium. However, the cavity 9 is preferably provided with an inlet 10 and an outlet 11 and, apart from this inlet and outlet, is closed in a liquid-tight manner. The cavity 9 is incorporated in a closed cooling or refrigeration circuit by means of the inlet and outlet 10, 11.

Figure 4:
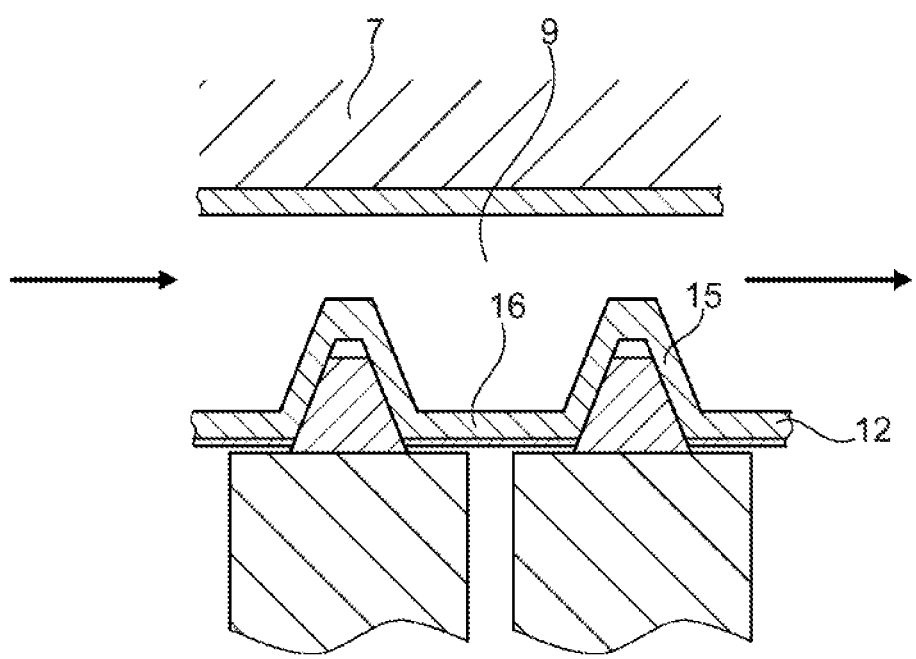
FIG. 4 is a schematic illustration of one development of the cover from FIG. 1, having a coolant or refrigerant flow in the conductor tracks.

FIG. 4 is a schematic illustration of one development of the cover from FIG. 1, having a coolant or refrigerant flow in the conductor tracks. In the exemplary embodiment illustrated in FIG. 4, the cavity 9 which is adapted to accommodate the cooling medium is formed by the interior of a pipe 12 which extends continuously from the inlet 10 to the outlet 11. In the pipe 12, the contact sockets 15 are formed by indentations in the pipe 12 in a form described in connection with the contact sockets 5. In order to form the conductor tracks 16 or to produce the electrical conductivity of the conductor tracks 16 which connect selected contact sockets 15 to one another and in order to form the electrical conductivity of the contact sockets 15, the sections of the pipe 12 which form the conductor tracks 16 and the contact sockets 15 are formed from electrical conductive material and the remaining sections of the pipe 12 are formed from electrically insulating material. However, the pipe 12 could also be continuously formed from electrically insulating material and could be covered or coated with an electrically conductive material in sections in order to produce the electrical conductivity of the conductor tracks 16 and the contact sockets 15.

Whereas the invention has been illustrated and described in detail in the drawings and the preceding description, this illustration and description should be understood as illustrative or exemplary and not restrictive, and the intention is not to restrict the invention to the exemplary embodiments disclosed. The mere fact that particular features are mentioned in different dependent claims is not intended to indicate that a combination of these features also could not be advantageously used.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cover for electrically coupling a plurality of storage cells of an electrical energy storage module, comprising:
    electrically conductive contact sockets which are embedded in an electrically insulating material of the cover, taper inward on their inner sides and into which poles of the storage cells are insertable so as to make electrical contact;
    two connections, one of which forms a positive pole and the other of which forms a negative pole of the electrically coupled storage cells; and
    a plurality of conductor tracks that electrically couple the storage cells in a predefined manner, wherein
    the conductor tracks are completely accommodated inside the cover,
    the cover is mountable on the storage cells such that the cover is releasable in a non-destructive manner, and
    the inner sides of the electrically conductive contact sockets are configured to make electrical contact with outer sides of the poles.

2. The cover according to claim 1, wherein
    the contact sockets are conical on their inner sides.

3. The cover according to claim 1, wherein
    the cover has an at least three-layer structure, wherein a conductor track layer is embedded between two electrically insulating cover layers.

4. The cover according to claim 1, wherein
    the cover has a cavity for liquid coolant or refrigerant.

5. The cover according to claim 4, wherein
    the cavity is adjacent to the conductor tracks, but is outside the conductor tracks.

6. The cover according to claim 4, wherein
    the cover respectively has an inlet and an outlet which open into the cavity and via which coolant or refrigerant is supplied and discharged.

7. The cover according to claim 4, wherein
    the coolant is a phase change material.

8. The cover according to claim 4, wherein
    the cavity for the coolant or refrigerant is provided by a pipe which, in order to form the conductor tracks, is coated with electrically conductive material in sections or is composed of sections of electrically conductive material and electrically insulating material.

9. The cover according to claim 1, wherein
    the plurality of conductor tracks couple the storage cells in series.

10. An electrical energy storage module, comprising:
    a cover according to claim 1; and
    a multiplicity of storage cells which are electrically coupled using the cover.

11. The electrical energy storage module according to claim 10, wherein
    the storage cells are lithium ion batteries.

12. A motor vehicle, comprising:
    an electrical energy storage module according to claim 10.

\* \* \* \* \*